(12) United States Patent
Schindler et al.

(10) Patent No.: US 6,307,521 B1
(45) Date of Patent: Oct. 23, 2001

(54) RF AND IR BISPECTRAL WINDOW AND REFLECTOR ANTENNA ARRANGEMENT INCLUDING THE SAME

(75) Inventors: Gerhard Schindler, Munich; Erwin Haertinger, Stockdorf; Uwe Leupelt, Olching, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/378,973

(22) Filed: Aug. 23, 1999

(30) Foreign Application Priority Data

Aug. 22, 1998 (DE) ............................... 198 38 246

(51) Int. Cl.$^7$ ................................. H01Q 13/00
(52) U.S. Cl. .................. 343/781 CA; 343/755; 343/753; 342/53
(58) Field of Search ............... 343/781 CA, 720, 343/725, 700 MS, 753, 755; 342/52, 53

(56) References Cited

U.S. PATENT DOCUMENTS

| | | |
|---|---|---|
| 4,355,313 | 10/1982 | Hubert . |
| 5,182,564 | 1/1993 | Burkett et al. . |
| 5,307,077 | 4/1994 | Branigan et al. . |
| 5,327,149 | 7/1994 | Kuffer . |

FOREIGN PATENT DOCUMENTS

| | | |
|---|---|---|
| 4010242 | 10/1991 | (DE) . |
| 0583557 | 2/1994 | (EP) . |

OTHER PUBLICATIONS

Article entitled "Offset Dual Reflector Antenna" by Y. Mizugutch et al.; IEEE–Proc. Int. Symp. Antennas and Propagation, Stanford, CA, Jun. 1977, pp. 1, 3, 4, 5.

Antenna Handbook, Y.T. Lo, S.W.Lee, New York, 1988, pp. 21–13; Van Nostrand Reinhold Comp.

"Synthesis of dual–offset shaped reflectors for arbitrary aperture shapes using continuous domain deformation", by B. S. Westcott et al., IEEE–Proceedings, vol. 133, Pt. H, No. 1, Feb. 1986.

"Multispectral (IR/MMW) Dome for Seeker Application", by B. Forti et al.; 6th European Electromagnetic Structure Conference Proceedings, Dornier/Deutsche Aerospace, Friedrichshafen, Germany, 1991.

*Primary Examiner*—Don Wong
*Assistant Examiner*—Ephrem Alemu
(74) *Attorney, Agent, or Firm*—W. F. Fasse; W. G. Fasse

(57) ABSTRACT

A reflector antenna arrangement can transmit and receive both infrared (IR) and millimeter wave (RF) radiation. The arrangement includes a main reflector (1), a subreflector (2), an IR feed system (4), an RF feed system (3), a radome (5), and a bispectral window (6) arranged in an opening provided in a central area of the main reflector (1). The RF feed system is oriented so that the RF radiation path includes a double reflection from the subreflector and from the main reflector, while the IR feed system is arranged directly behind the bispectral window so that the IR beam path extends directly through the bispectral window without reflecting from the main reflector or the subreflector. The bispectral window has a high reflectance for the RF radiation and a high transmittance of the IR radiation. The bispectral window is made of a dielectric material and has rotationally symmetrical front and back surfaces, whereby the front surface contour is optimally matched to the front surface of the main reflector and the back surface contour achieves an optimal reflectivity of the RF radiation and an optimal transmissivity of the IR radiation. Undesired influences between the IR radiation and the RF radiation are avoided by the separation of the signal beam paths.

30 Claims, 7 Drawing Sheets

RF AND IR BISPECTRAL WINDOW AND REFLECTOR ANTENNA ARRANGEMENT INCLUDING THE SAME

PRIORITY CLAIM

This application is based on and claims the priority under 35 U.S.C. §119 of German Patent Application 198 38 246.4, filed on Aug. 22, 1998, the entire disclosure of which is incorporated herein by reference.

FIELD OF THE INVENTION

The present invention relates to a bispectral window selectively transmitting and reflecting infrared and millimeter wave (radio frequency) radiation, as well as a reflector antenna arrangement that incorporates such a bispectral window.

BACKGROUND INFORMATION

Attempts have been made in the art to provide a single antenna system that is suitable for transmitting and/or receiving radiations in more than one frequency spectrum or wavelength range. For example, the article "Multispectral (IR/MMW) Dome For seeker Application" by G. Forti, W. Menicacci—S.M.A., A. Novi, G. Simoncini, and L. Calami, OFF. GALILEO, Florence, Italy, pages 157 to 166, as published in the Sixth European Electromagnetic Structures Conference Proceedings, Friedrichshafen, Germany (1991), discloses a rotationally symmetrical Cassegrain-Antenna arrangement which is schematically shown in present FIG. 9. This conventional reflector antenna arrangement includes a primary or main reflector 101 and a secondary or subreflector 102 arranged symmetrically and coaxially along a common radiation axis CA. Infrared (IR) active elements 104 as well as millimeter wave radiation (RF) active elements 103 are integrated together into a feed horn arranged along the common axis in a typical Cassegrain arrangement. Due to the incorportion of both IR elements 104 and RF elements 103 into the feed horn, both the IR radiation and the RF radiation will be reflected in the same manner along the same path from the subreflector 102 and from the main reflector 101, and in common along the common axis CA.

With the above described known arrangement, the infrared (IR) signals suffer undesirable side effects, especially in some applications, because it is impossible to optimize the reflectors simultaneously both for the RF radiation and for the IR radiation. For this reason, it becomes necessary to provide a directly radiating aperture for the IR radiation. Such a directly radiating aperture, however, cannot be provided in a system in which the radiation directions or radiation axes of the two radiation spectra are coincident along the common axis CA, because both the exciter as well as the subreflector would necessarily be located in the beam path and thus in the way of a direct radiation of the IR radiation. Furthermore, it has been a continuing problem for conventional antennas to achieve a space-saving integration of a millimeter wave sensor system for RF radiation and an infrared system for IR radiation in a particularly compact arrangement, for example using an offset double reflector antenna arrangement. Particularly, it has not been possible to achieve an acceptable antenna system having the following characteristics: a direct radiating infrared aperture without interference, the smallest possible degradation of the millimeter wave RF signal path, and a coincidence of the radiation beam axes of the two systems externally from the antenna arrangement.

SUMMARY OF THE INVENTION

In view of the above, it is an object of the invention to provide a bispectral window for a reflector, as well as a reflector antenna arrangement using such a bispectral window, which is able to receive and/or transmit both infrared (IR) radiation as well as millimeter wave (RF) radiation without suffering undesirable side effects on the IR radiation, and which has a very compact space-saving arrangement using a comparatively small space for the RF sensor system and for the IR system. The invention further aims to avoid or overcome the disadvantages of the prior art, and to achieve additional advantages, as apparent from the present specification.

The above objects have been achieved in a bispectral window for a reflector for radiation in the infrared (IR) and millimeter wave (RF) ranges, according to the invention. The bispectral window consists essentially of a dielectric material having a low loss factor and a high dielectric constant. Furthermore, the bispectral window comprises respective front and back surfaces that each have a respective rotationally symmetrical aspherical surface contour or shape. The front surface of the bispectral window is arranged on the side of the reflector on which the RF radiation is incident, and the surface contour of the front window surface is optimally matched to that of the surface of the reflector for reflecting the RF radiation. The back surface of the bispectral window has a surface contour that is shaped to achieve an optimal reflectivity for the RF radiation. In this manner, more particularly, the bispectral window is substantially transparent to the IR radiation and substantially reflective for the RF radiation.

The above objects have further been achieved according to the invention in a reflector antenna arrangement including a main reflector having a hole or opening in a central area thereof, and a bispectral window arranged in the hole or opening. The bispectral window is substantially transmissive for IR radiation and is substantially reflective for RF radiation. An RF feed horn, which may include an RF source and/or an RF sensor, is arranged so that RF radiation is reflected from the front surface of the main reflector and the front surface of the bispectral window, from or to the RF feed horn, either directly or via a subreflector. On the other hand, an IR feed or active element, which may include an IR source and/or an IR sensor, is arranged behind the bispectral window that is received in the opening in the reflector. Thus, IR radiation is transmitted through the bispectral window forming an IR aperture, respectively from the IR source or to the IR sensor. The surface contour of the front surface of the bispectral window is substantially matched to and flush with the front surface of the reflector. The back surface of the bispectral window has a surface contour for optimizing the RF reflectivity.

The bispectral window according to the invention, and particularly the arrangement of such a bispectral window in an opening in the central area of a main reflector of an antenna arrangement, achieves a frequency selective separation of the two signal paths of the respective IR and RF radiations. In this manner, the IR signal path does not need to follow the reflection path via main reflector and a subreflector, but instead can be transmitted and radiated directly through the bispectral window representing a direct radiation IR aperture. On the other hand, the RF radiation follows a double reflection path, being reflected from the main reflector including the bispectral window and from the subreflector. Nonetheless, the two radiation beam paths are coincident along a common axis external to the reflector antenna arrangement. By separating the beam paths in this manner, undesirable side effects on the IR radiation can be prevented while maintaining the external common beam axis. Also, the inventive integration of the two systems achieves a very compact and space-saving arrangement while still achieving the above mentioned advantages.

BRIEF DESCRIPTION OF THE DRAWINGS

In order that the invention may be clearly understood it will now be described in connection with an example embodiment, with reference to the accompanying drawings, wherein.

DETAILED DESCRIPTION OF PREFERRED EXAMPLE EMBODIMENTS AND OF THE BEST MODE OF THE INVENTION

FIGS. 1 to 7 all relate to a preferred example embodiment of a reflector antenna incorporating a bispectral window according to the invention, wherein the antenna is arranged in the manner of an offset double reflector Gregorian antenna. However, other single and double reflector antenna arrangements can be embodied with a bispectral window according to the invention. For example, a Cassegrain arrangement can also utilize the present bi-spectral window, but such a Cassegrain arrangement is not as spatially compact as the present preferred offset Gregorian arrangement.

Figure 1:
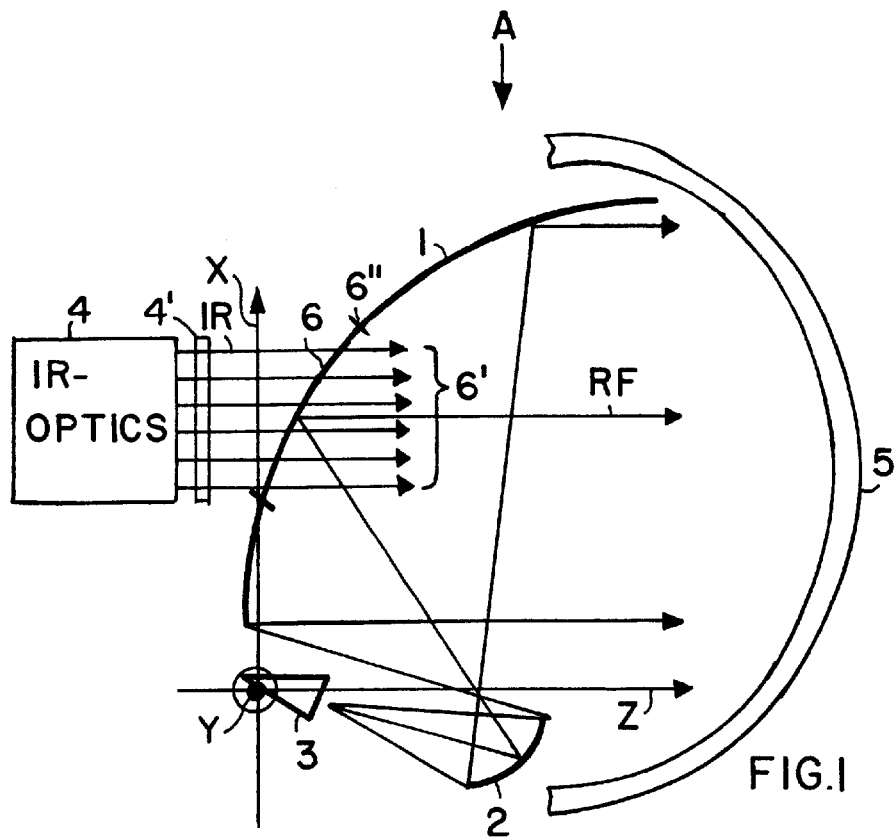
FIG. 1 is a schematic diagram of a reflector antenna incorporating a bispectral window according to the invention, arranged in the manner of an offset Gregorian reflector antenna.

As shown schematically in FIG. 1, the present example embodiment of an offset Gregorian reflector antenna A comprises a main reflector 1, a subreflector 2, a millimeter wave RF feed horn or exciter 3, an IR optics system 4, and a radome 5, as well as a bispectral window 6 arranged according to the invention in an opening 6" provided in a central area of the main reflector 1. While FIG. 1 illustrates the situation in which the IR optics system 4 and the RF feed horn 3 are respective radiating sources of IR and RF radiation, the present invention also applies to a radiation receiving antenna, in which the IR optics system 4 comprises an IR sensor, and the RF feed horn 3 comprises an RF receiver or sensor. FIG. 1 also shows a reference coordinate system x, y, z that will be used in the following discussion.

In general, the present offset Gregorian antenna A will be optimized in a typical manner for achieving and optimizing the radiation characteristics, such as the cross polarization, the minor or side lobe characteristics, the gain, and the like, as required for a particular application of the antenna. Additionally, and more particularly as described in the following, the antenna contours, i.e. the surface contours of the reflectors and of the bispectral window according to the invention, will be determined or optimized. In this context it must be noted that reflector surfaces are usually free-form surfaces and can only be approximately illustrated as and represented by general second order surfaces.

First, the general aspects of the design of the double reflector antenna system will now be described. Given a rotationally symmetric main feed distribution, a desired aperture radiation, an elliptical aperture configuration, and a few more geometric parameters, it is possible to design an offset double reflector antenna system having a low cross polarization level, for example using a numerical method such as the CARTA method, which is described in the article "Synthesis of Dual-Offset Shaped Reflectors for Arbitrary Aperture Shapes Using Continuous Domain Deformation" by Professor Westcott of the University of Southampton as published in IEEE Proceedings, Vol. 133, Pt.H, No. 1, (February 1986). The starting point for the design or synthesis of the contours of the reflectors typically uses the well known Mizugutch condition for conic reflector surfaces, which is described in the article by Y. Mizugutch entitled "Offset Dual Reflector Antenna" in the IEEE International Symposium, Stanford, Calif., (June 1977).

The aperture size is 350 mm·225 mm, and the primary field is determined by a $\cos^n(\theta)$ function with an edge decay or attenuation of 15 dB with an edge angle of 28°. A number of simulations were carried out in order to find a very compact antenna arrangement according to the invention, which would fit entirely within a hemisphere having a radius of 2250 mm. The result is the offset Gregorian antenna arrangement schematically shown in FIG. 1.

The primary field is approximated by $$F_p = \cos^n(\theta); n \approx 14$$

The desired amplitude illumination or radiation of the elliptical aperture with semi-axes a and b is given by a one parameter Hansen distribution, wherein the parameter H is selected for a 25 dB minor or side lobe level:

$$|f(\rho)| = I_0(H \cdot \pi \cdot \sqrt{1-\rho^2});$$

$$\rho = \sqrt{\left(\frac{x-x_0}{a}\right)^2 + \left(\frac{y}{b}\right)^2}; \quad -a \leq x \leq a; -b \leq y \leq b;$$

wherein $x_0$ identifies the location of the aperture center along the antenna coordinate x-axis as shown in FIG. 1. Both the exciter axis and the subreflector axis are tilted or tipped with respect to the z-axis, which is necessary for minimizing the cross-polarization.

Moreover, the two following important points must also be taken into account in the overall design of the antenna system. First, due to astigmatism, there are two phase centers or nodes between the subreflector 2 and the main reflector 1. Secondly, a GO synthesis does not take diffraction effects into account. However, a PO analysis shows that a slight change of the tilt angle of the subreflector can optimize the cross polarization.

Now an approximation of the optimum determination of the shape or contour of the main reflector will be described. In this context it should be noted that optical surfaces are generally limited to simple rotationally symmetrical contours or forms. Thus, the central area of the main reflector surface within a radius of 45 mm around the bore site axis of the main reflector is approximated using a least squares fit analysis. In this regard, a general polynomial having the following form with a maximum order of 2 is used:

$$S(x,y,z) \equiv a_0 + a_1 x + a_2(x^2 + y^2) + a_3 xz - z = 0$$

The preceding equation represented a rotationally symmetrical conic surface rotated about the y-axis and shifted along the x- and z-axes with respect to the antenna coordinate system x, y, z. A segment of a hyperboloid was determined to provide the best solution or best fit, which has a deviation along the z-direction of approximately 0.02 mm as the root mean square (RMS) effective value or 0.05 mm as the peak value, or a value of $\lambda/160$ RMS or $\lambda/64$ peak value with respect to the wavelength $\lambda$. In a conventional reflector antenna arrangement, such a small deviation would not be problematic. However, in the present arrangement according to the invention, the error is a systematic error of which the effects are not adequately or properly represented by the root mean square effective value. More particularly, the resulting aperture phase error due to the contour deviation in the central area of the main reflector is designated as $\Delta \psi_A(x,y)$.

Now the design of an IR transmitting bispectral window according to the invention will be described in greater detail. The bispectral window must satisfy the following requirements. The window is made of a dielectric material with a low loss factor and a high dielectric constant or permittivity, an optimal transmissivity for infrared (IR) radiation together with an optimal reflectivity for millimeter wave (RF) radiation. More particularly, the dielectric constant or permittivity $\epsilon$ is about 8, e.g. from 7.5 to 9, and the IR transmissivity and RF reflectivity are each greater than 50% (i.e. a majority of the respective incident radiation), or especially at least 65%, preferably at least 70%, and more preferably at least 75%. Moreover, the front and back surfaces of the bispectral window must have surface contours defined as rotationally symmetrical surfaces, whereby the front surface of the bispectral window is optimally matched so as to have a minimum deviation relative to the surface contour of the front surface of the main reflector. In this context, it should be understood that the front surface of the reflector is the surface or side of the reflector on which the RF radiation is incident.

The surface contours of the subreflector and of the main reflector are generally determined or synthesized by computer-based calculations in order to achieve certain required radiation characteristics, such as the gain and the side or minor lobe characteristics of the antenna for a prescribed exciter field. As a result, these surface contours are generally free-form surface contours that cannot be precisely defined as rotationally symmetrical conic section surfaces. Thus, the central part or area of the main reflector defined by a hole or opening provided in the main reflector cannot simply be directly replaced by a rotationally symmetrical surface.

Furthermore, it is generally not possible or suitable to provide a metallic coating on the bispectral window for the purpose of increasing its reflectivity, or to arrange a frequency selective structure in connection with the bispectral window, for IR optical reasons. Namely, while enhancing the RF reflectivity, such measures would generally interfere with the IR optical transmission characteristics.

For the above reasons, a portion or central area of the main reflector bounded by a circular boundary as seen in the main beam direction will be approximated as a general rotationally symmetric second order surface. This central portion or area of the main reflector is physically represented by a hole or opening provided in the main reflector, in which the bispectral window having the correspondingly determined surface contours will be arranged. Since only a relatively small area of the main reflector must be replaced by the bispectral window to meet the needs of the IR system, the above mentioned approximation of the surface contour in this area as a general rotationally symmetric second order surface is possible with only a slight deviation from the true optimum surface contour.

A suitable description of a formed or aspherical surface contour in an optical system is given in the so-called aspherical equation that is typically used in the field of optics. This aspherical equation is, for example, described in the "Antenna Handbook" by Y. T. Lo and S. W. Lee, published by Van Nostrand Reinhold Company, New York, 1988, page 21–13 as follows:

$$z' = \frac{cr^2}{1 + \sqrt{1 + (1-K)c^2 r^2}} + \sum_{i=1}^{N} b_i r^{2(i+1)};$$

$$r = \sqrt{x'^2 + y'^2};$$

wherein K is the conic coefficient, r is the spacing or distance of the respective location on the rotational surface from the axis, c determines the curvature of the surface at the apex or crown, and $b_i$ are the coefficients of the polynomial. The first term represents the surface in the form of a hyperboloid (K<−1), a paraboloid (K=1), an ellipsoid (−1<K<−0), a sphere (K=0) or a spheroid (K>0).

In the following, the above equation will be limited only to quadratic terms, so that all of the coefficients $b_i$ can be omitted. The parameters K and c can simply be set by means of a suitable transformation with respect to the general polynomial parameters $a_i$. Thus, with reference to the illustration according to FIGS. 2 and 3, the above aspherical equation can be simplified into the following form:

$$\zeta = \frac{c_s(\xi^2 + \eta^2)}{1 + \sqrt{1-(1+k_s)c_s^2(\xi^2+\eta^2)}}.$$

The transformation into the antenna coordinate system is carried out by means of the transformation matrix T, which is dependent on the translation and rotation parameters as follows:

$$\begin{pmatrix} x \\ y \\ z \end{pmatrix} = T \times \begin{pmatrix} \xi \\ \eta \\ \zeta \end{pmatrix}; \quad T = T(\Delta x, \Delta z, \alpha_y)$$

Figure 2:
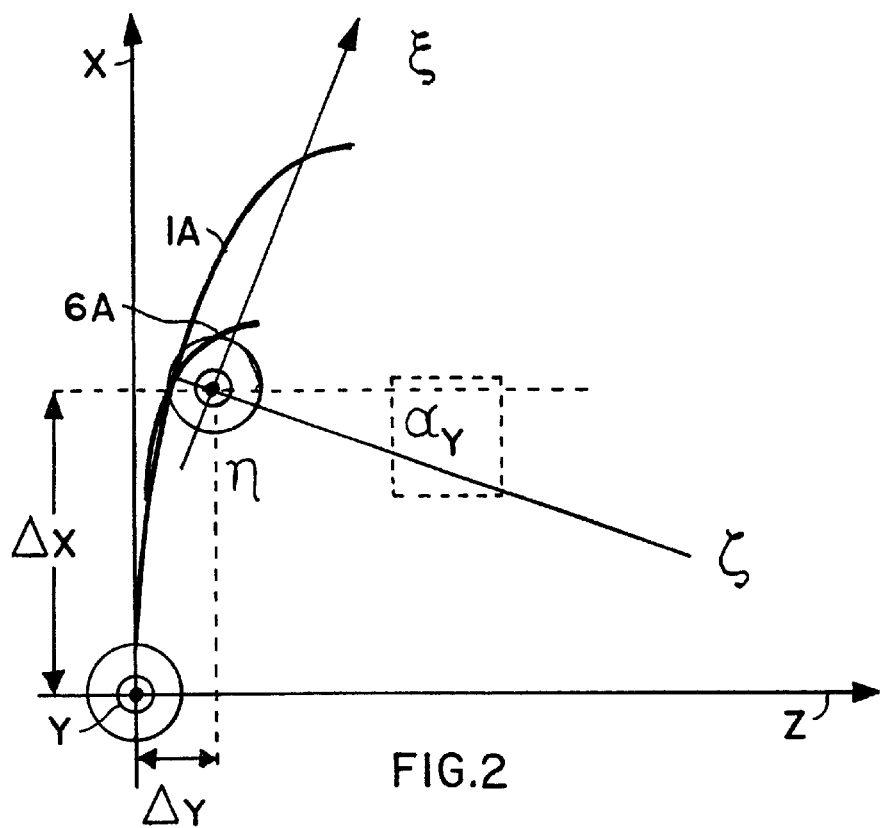
FIG. 2 is a schematic diagram illustrating a coordinate system and the transformation parameters for determining the contour of the main reflector and of the front surface of the bispectral window according to the invention.
Figure 3:
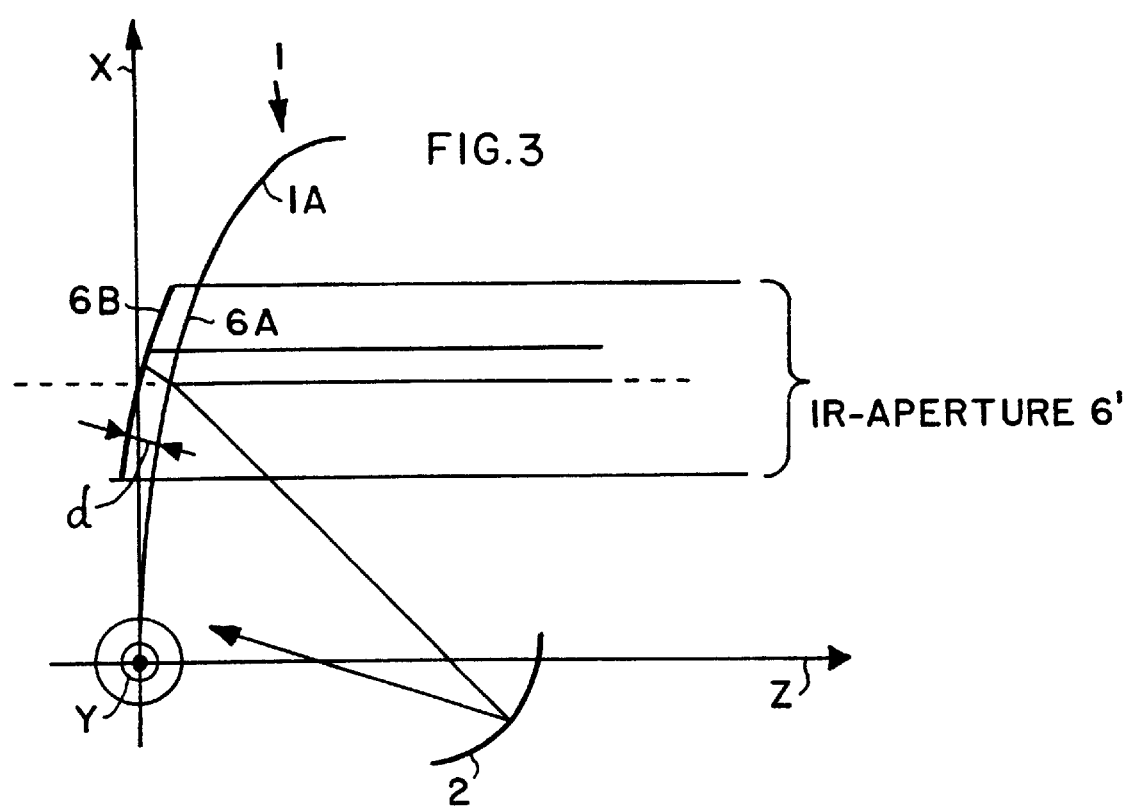
FIG. 3 is a schematic diagram illustrating the coordinate system in connection with the determination of the contour of the rear surface of the bispectral window according to the invention.

The two coordinate systems and the transformation parameters are shown in FIGS. 2 and 3.

The electrical characteristics and particularly the radiation transmission characteristics of the infrared transmitting bispectral window 6 are defined by the characteristics of the respective dielectric material of the window 6, and by the respective contours or configurations of the two surfaces of the window. Namely, the window may consist essentially of a dielectric material comprising one or more of ZnS, Ge, and Si, or may consist essentially of a single one of these substances. The dielectric material is selected depending on the particular application, so as to provide the required dielectric characteristics. The two relevant surfaces of the bispectral window 6 are the front surface 6A onto which the RF radiation reflected from the subreflector 2 is incident, and the back surface 6B on an opposite side of the window 6 relative to the front surface 6A.

The surface contour of the front surface 6A of the window 6 is completely defined by the surface contour of the corresponding area of the main reflector surface 1A of the main reflector 1 that is replaced by the window 6. Namely, the contour of the front surface 6A of the bispectral window 6 is adapted or selected to match the curvature of the main reflector surface 1A. On the other hand, the back surface 6B of the bispectral window 6 is necessary for, and is properly configured to achieve, a low optical infrared total aberration, a maximum millimeter wave reflectivity, and a maximum infrared transmissivity.

Figure 10:
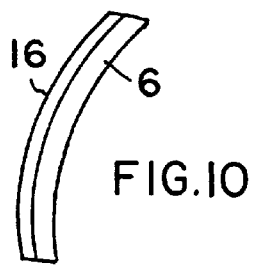
FIG. 10 is a schematic diagram of a bispectral window having an IR transmissive coating for a reflector according to the invention.
Figure 12:
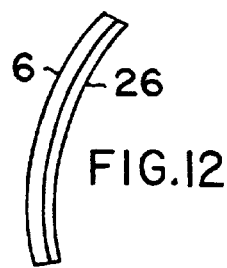
FIG. 12 is a schematic diagram of a bispectral window having an RF reflective coating for a reflector according to the invention.
Figure 11:
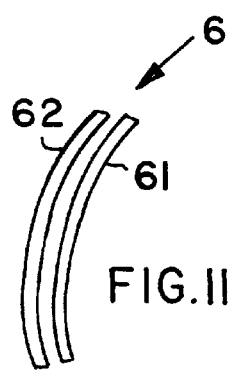
FIG. 11 is a schematic diagram of a two-layered bispectral window for a reflector according to the invention.

Since the infrared wavelength is smaller than the millimeter RF wavelength by a factor of $10^3$, it would generally be possible to apply a suitable coating 16 on the window 6 (see FIG. 10) in order to increase the infrared transmissivity to a sufficient level. Also, in principle there are several different possibilities for increasing the millimeter wave RF reflectivity of the front surface 6A of the window 6, such as resonant structures, metal wires or grids, layered dielectric leaves or panes 61 and 62 (see FIG. 11), thin conducting layers 26 of Al, Zn, Ti, Au or Ag (see FIG. 12) or the like, or using very high dielectric constants as a general measure. However, unfortunately, these generally recognized alternatives do not meet the optical infrared requirements in the present application. Instead, the only useable solution for achieving the present desired high IR transmissivity simultaneously with the high RF reflectivity is to properly select or tune the thickness of the dielectric core of the bispectral window 6 to achieve the lowest possible loss while providing a constructive interference between RF radiation waves reflected from the front surface and from the back surface respectively.

The several parameters defining the surface contour of the front surface 6A are selected or determined so as to minimize the deviation of the front surface 6A of the window 6 from the front surface 1A of the main reflector 1 in the z-direction. This is achieved by a fitting or adaptation using a least squares fit method. Particularly, the parameters defining the surface contour of the front surface include the conic constant $k_{sv}$, the paraxial curvature $c_{sv}$, the tilt about the y-axis $\alpha_y$, the translation or shifting along the z-axis $\Delta_z$, and the translation or shifting along the x-axis $\Delta_x$. Simulation calculations have shown that the remaining or residual deviation becomes very small with respect to the millimeter wave RF wavelength. This deviation is shown in an exaggerated manner in FIG. 3.

The surface contour of the rear or back surface 6B of the bispectral window 6 is now referenced to the same rotation axis as the surface contour of the front surface 6A. The several surface contour defining parameters of the back surface 6B, including the conic constant $k_{sh}$, the crown curvature $C_{SH}$, the axial shifting or translation $s_a$ relative to the front contour along the $\zeta$-axis are selected with the aid of a numerical optimizing process so that the reflectivity of the resulting bispectral window 6 over the entire aperture 6' thereof is maximized and made as constant and uniform as possible.

The path length conditions necessary for achieving this and particularly for achieving the above described constructive or additive interference are determined from the geometrical-optical beam path between the subreflector 2 and the main reflector 1. Thus, the particular determined path distance or path length is a very specific condition that is only valid for the particular respective reflector system for which it has been determined. As a general principle, the thickness d of the window 6 is an odd multiple of a quarter wavelength of the respective pertinent radiation in the particular dielectric material of the window. In the case of perpendicular incidence of the radiation, the window thickness d is given by the known relationship:

$$d = n \cdot \frac{\lambda_0}{4\sqrt{\varepsilon}}; n = 1, 3, 5, 7, \ldots$$

Figure 4:
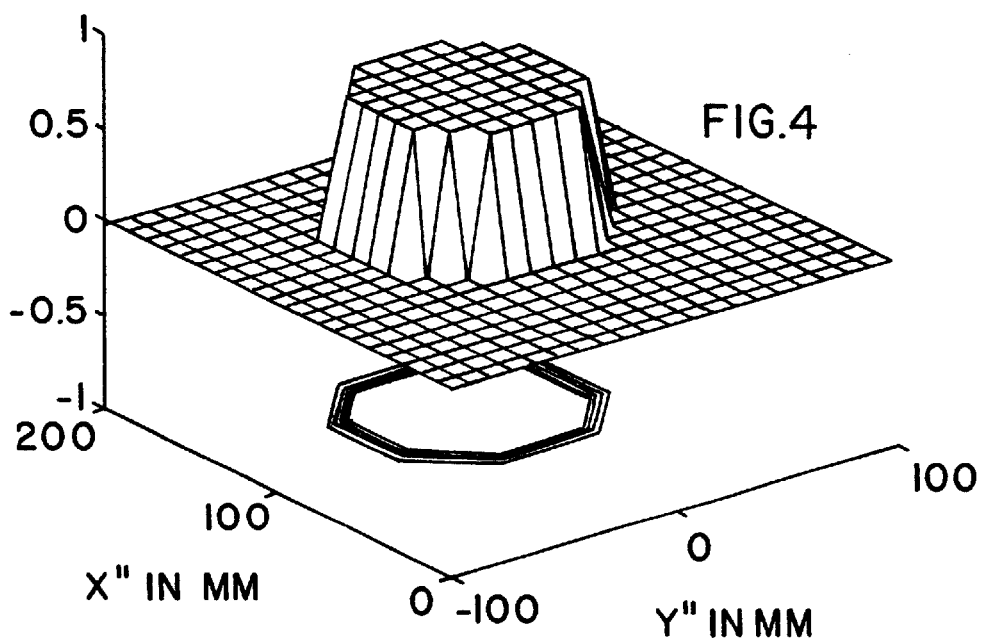
FIG. 4 is a three-dimensional graph of the reflectivity over the infrared aperture provided by the bispectral window.

On the other hand, in the case of non-perpendicular incidence of the radiation, the thickness d is determined by a complex function of the incidence angle and the polarization. In view of the above, the back surface 6B of the window 6 acts as a millimeter wavelength (RF) active element by causing a constructive interference of the reflection from the back surface with the reflection from the front surface. The back surface's characterizing parameters including the apex or crown spacing and apex or crown curvature as well as conic constants are designed and selected to achieve a maximum reflectivity, particularly of at least about 70%, having a uniform or constant value substantially over the entire window aperture 6' for both polarizations of radiation, as is shown in FIG. 4.

Figure 5:
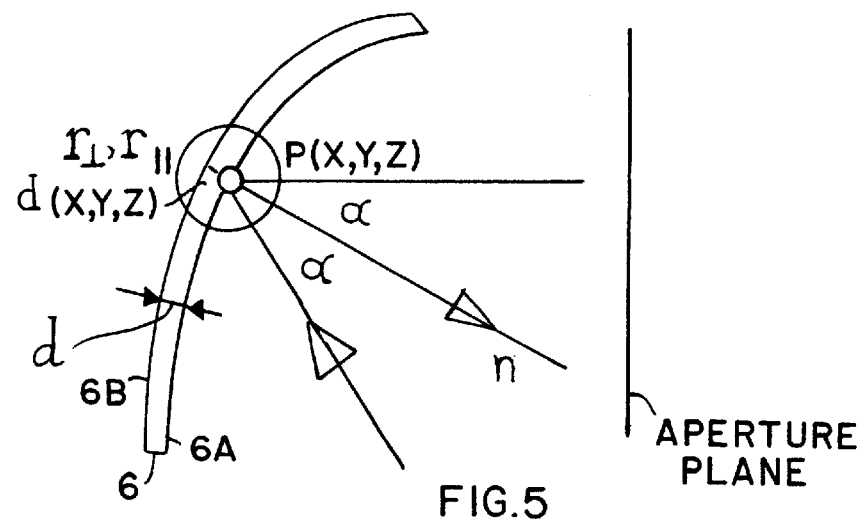
FIG. 5 is a schematic diagram illustrating a reflection from the bispectral window according to the invention.

The components of the disturbed or interference-effected aperture illumination with respect to the ideal illumination condition are given by the vector relationship:

$$f = T_W \cdot f_0$$

$$T_W = \frac{-1}{n_x^2 + n_y^2} \cdot \begin{pmatrix} r_n n_y^2 + r_p n_x^2 & n_x n_y (r_n - r_p) \\ n_x n_y (r_n - r_p) & r_n n_x^2 + r_p n_y^2 \end{pmatrix}$$

wherein $n_x$ and $n_y$ are the normal unit vector components of the front surface and $r_\parallel$ and $r_\perp$ are the Fresnel reflection coefficients for parallel and normal radiation incidences, respectively, as shown in FIG. 5, which illustrates a reflection from the bispectral window 6. The function $T_w$ is a function of six parameters, namely the angle of incidence, the respective apex or crown curvature for the front surface and for the back surface, the respective conic coefficients for the front surface and for the back surface, and the spacing between the crowns of the curved contours.

Since the surface contour of the back surface 6B is selected or designed for optimizing the millimeter wave RF reflection performance, it will generally not be optimal for the IR transmission in connection with the infrared system 4. For this reason, an auxiliary infrared corrective optics 4' can be provided outside of the overall reflector system. Such a corrective optics 4' is schematically illustrated in FIG. 1, but could be arranged at any location in the beam path of the IR radiation for optically correcting the IR radiation.

Next, a design of the radome 5 will be described. The entire antenna arrangement is covered or enclosed by a hemispherical single layer radome 5 having a constant wall thickness, as shown in FIG. 1. The radome 5 is made of a dielectric material, preferably ZnS, having a low loss factor and suitable dielectric constant ($\epsilon$=8.35, tan $\delta$=0.0024), as is also used for the infrared transmissive bispectral window 6. The constant uniform thickness of the radome 5 is approximately 7 mm. In order to calculate the electrical effects of the radome 5 on the radiation transmitted therethrough, the aperture theory has been used, and the antenna aperture has been projected onto a plane outside of the radome 5. The interaction of reflected radiation beams within the radome as well as any interference with the aperture field has been disregarded. A simulation and measurement results confirm the validity of such an approximation. At locations at which axis-parallel radiation beams intersect and pass through the wall of the radome 5, the wall is approximated locally as a planar dielectric layer of the given thickness, and the transmissivity coefficients $t_\perp$ and $t\|$ are calculated using the Fresnel formulas. A similar relationship as the above mentioned one also applies for the components of the disturbed or interference-effected aperture radiation:

$$f = T_R \cdot f_0$$

$$T_R = \frac{1}{n_x^2 + n_y^2} \cdot \begin{pmatrix} t_n n_y^2 + t_p n_x^2 & n_x n_y (t_n - t_p) \\ n_x n_y (t_n - t_p) & t_n n_x^2 + t_p n_y^2 \end{pmatrix}$$

An amplitude interference can be reduced to a polarization dependent minimum of 1.0 and 1.2 dB with an optimal thickness of the radome wall. At this point, a phase interference is present, which is essentially spherical and nearly independent of polarization. Once again, $n_x$ and $n_y$ represent the normal unit vector components of the radome surface and $t\|$ and $t_\perp$ represent the Fresnel reflection coefficients for parallel and normal incidence, but now the function $T_R$ is only a function of the incidence angle.

Finally, a radome phase compensation is carried out as follows. In order to compensate for the remaining or residual radome phase error, any one of the following three approaches could be selected. First, it would be possible to synthesize contours for an aperture covering with a defined phase passage characteristic. Secondly, it would be possible to carry out a subsequent deformation or readjustment of the main reflector surface to systematically approximate the ideal solution for minimizing the resulting errors. As a third possibility, the feed system could be moved in such a manner so as to generate a nearly spherical phase error of the same type, so as to carry out an approximating elimination or minimization of the overall phase error. Since software for carrying out the first above mentioned approach was not available, the third approach was carried out. A simulation demonstrated that a proper moving and tilting of the feed arrangement and of the subreflector was able to sufficiently eliminate or minimize the overall phase error by effectively cancelling out the radome phase error.

A simulation of the compact reflector system according to the invention was carried out. A software program known as "GRASP 7" (General Reflector Antenna Systems Program, TICRA, Copenhagen) was used to analyze the present compact reflector system. As an intermediate result of the actual or true aperture radiation of the reflector system, the value fo was extracted and the influences of the bispectral window reflectivity, the bispectral window surface contour deviations, and the radome transmissivity were calculated and taken into account. Then the aperture theory determined a gain function and a radiation diagram according to the following function:

$$G(u,v) = \frac{4\pi}{\lambda^2} \cdot \frac{\left| \int_{y_1}^{y_2} \int_{x_1}^{x_2} T_W \cdot T_R \cdot f_0 \cdot \exp(jk(ux+vy) + j\Delta\psi_A) dx dy \right|^2}{\int_{y_1}^{y_2} \int_{x_1}^{x_2} |f_0|^2 dx dy};$$

$$y_{1,2} = \pm b \sqrt{1 - (x/a)^2};$$

$$x_{1,2} = \pm a$$

where $f_0$ is the actual aperture radiation of the well focussed double reflector system in free space.

The disturbed or interference-affected aperture radiation $f_d = T_R \cdot T_W \cdot f_0$ exhibits a nearly spherical phase error, which predominantly arises from the influence of the radome. In order to compensate this influence, a suitable pre-focussing of the reflector system provides a nearly constant aperture phase. This was simulated through a rapidly converging iterative process. Software that can be used in the present context is, for example, the Extended Aperture Antenna Program (EAAP) which is a MATLAB-based software program developed by the present inventors for analyzing the gain and radiation characteristics and generating corresponding diagrams for elliptical apertures with any desired aperture distribution and polarization, including the effects of a radome and an infrared window.

The present bispectral window may have any aspherical surface contour of the front surface and the back surface, may be made of any desired lossy material, may have a multilayered structure, and may further be coated with a conductive coating material or an optical coating material on the front and/or back surfaces thereof. On the other hand, the structure of the radome according to the invention is preferably limited to a partial-spherical contour, with a single layer wall construction having a uniform or constant thickness of a desired lossy material.

Figure 7:
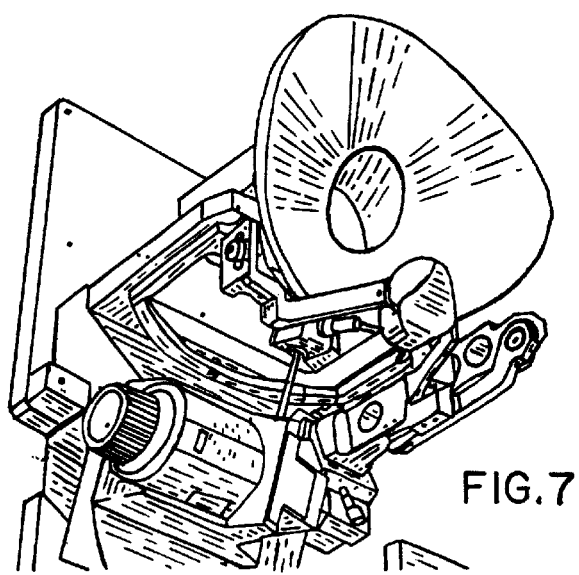
FIG. 7 is an overall view of a double reflector antenna arrangement having a bispectral window provided in an opening in the main reflector, mounted on a rotatable measuring stand.

The above described embodiment of an offset Gregorian double reflector antenna system according to the invention was developed, physically constructed and tested in the scope of the project known as ABGIII ("Aufklärung und Bekämpfung von Gefechts-ständen") (Reconnaissance and Combating of Combat Command Posts) in a frequency range of 94 GHz. FIG. 7 shows an overall view of the physically realized antenna system mounted on a rotatable measuring stand. The simulated calculations and the measurement results confirm the effectiveness of the inventive bispectral window arranged in a main reflector of such a reflector antenna system. Despite the small wavelength of about 3 mm, it was possible to reduce the deviations of the surface contour of the front window surface relative to the contour of the main reflector to such a low level that the radiation characteristics were essentially not influenced or changed by the provision of the bispectral window in a hole or opening in the central area of the main reflector according to the invention.

Figure 6A:
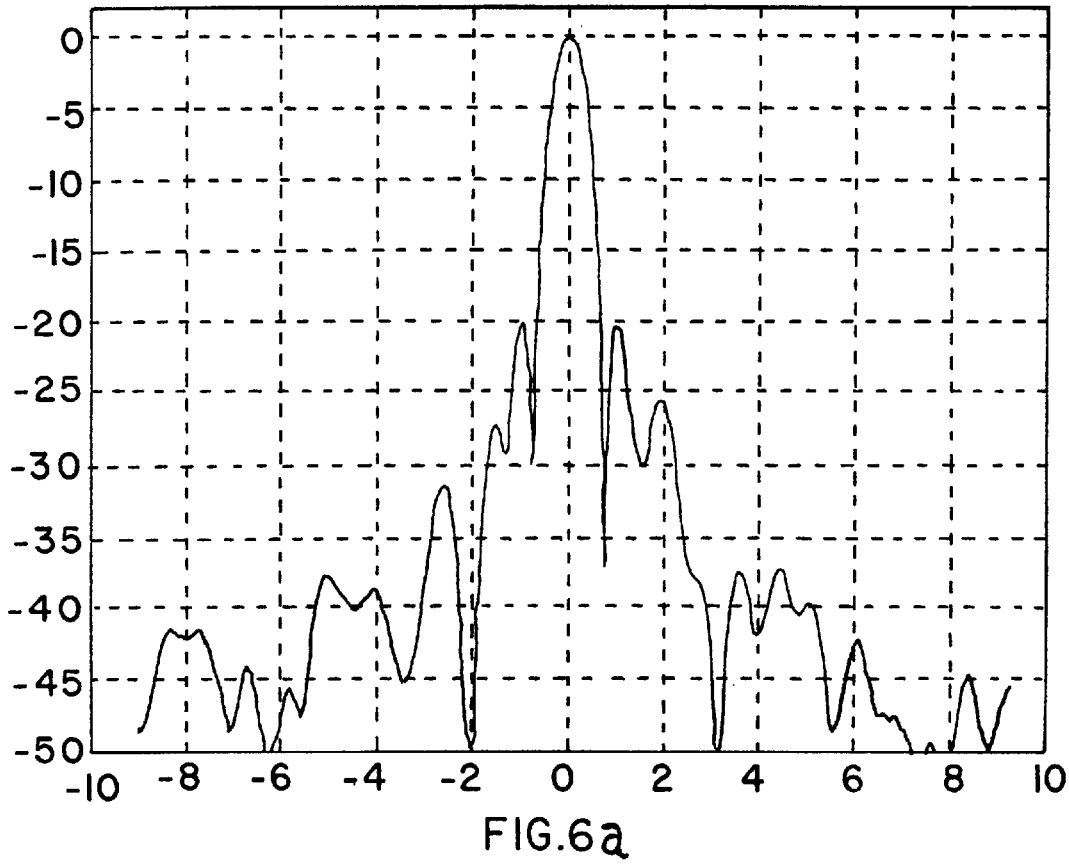
FIGS. 6A and 6B respectively show the two principle sections, i.e. sections rotated by 90° from each other on the principle axis of the reflector, of the radiation pattern of a main reflector provided with a bispectral window according to the invention.
Figure 6B:
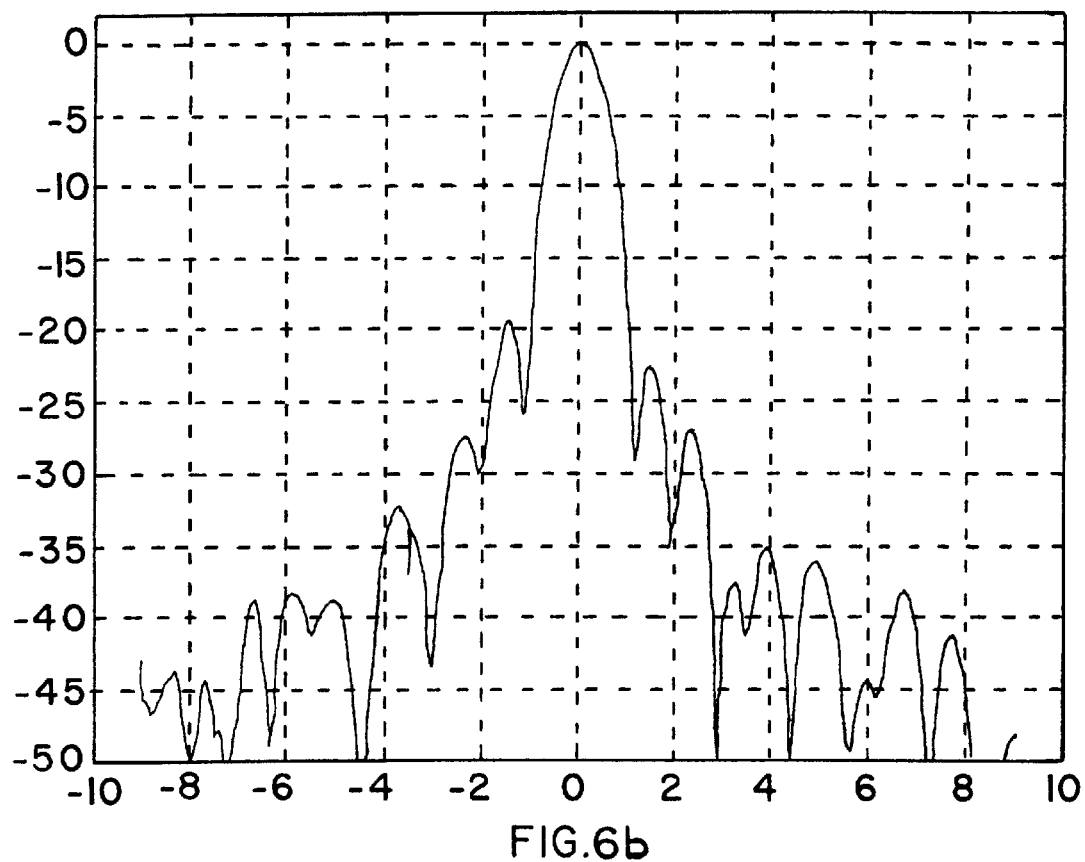
Figure 8A:
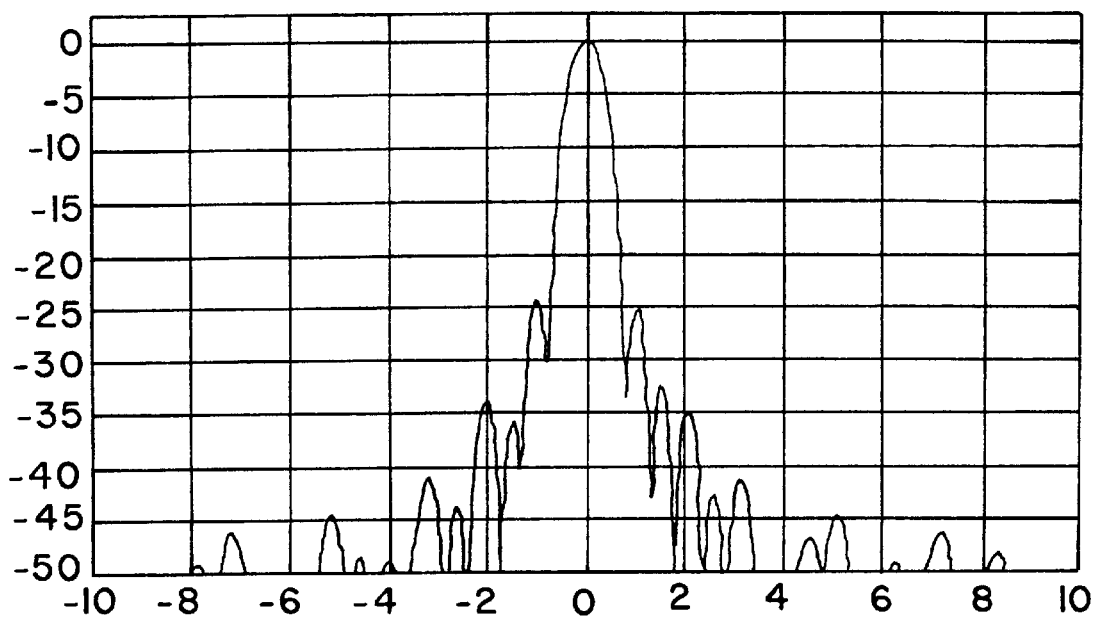
FIGS. 8A and 8B are respective principle sections generally corresponding to FIGS. 6A and 6B, but showing the radiation characteristic of a conventional full main reflector without a bispectral window.
Figure 8B:
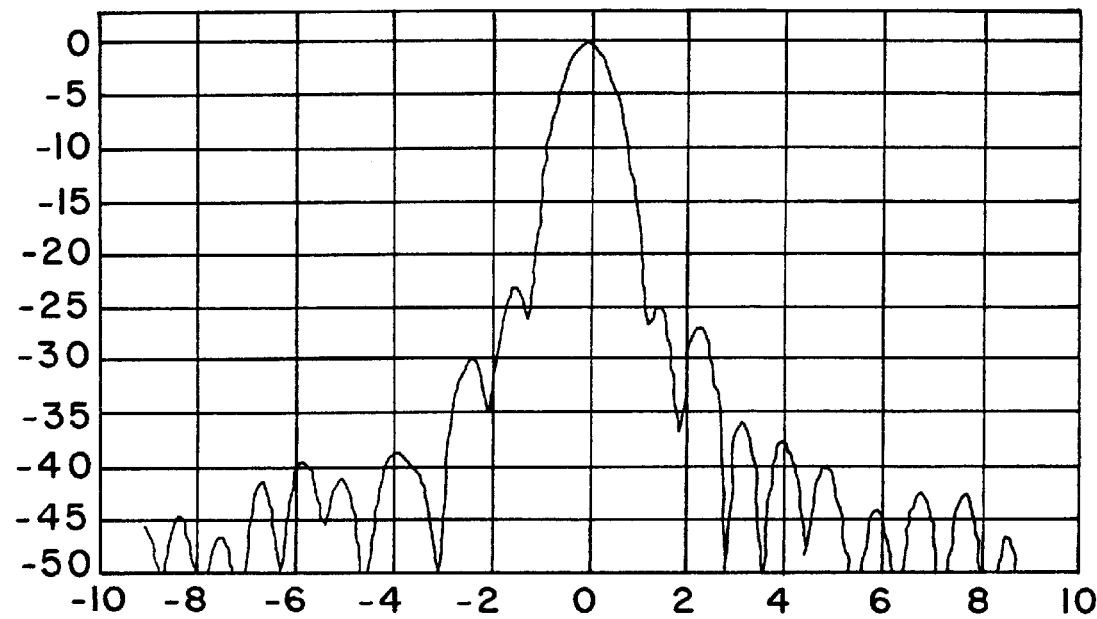
Figure 9:
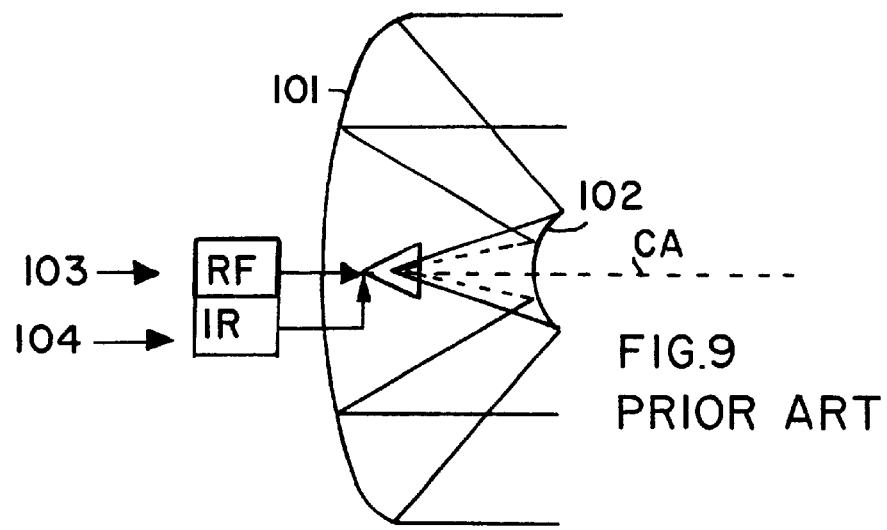
FIG. 9 is a schematic diagram of a conventional rotationally symmetric Cassegrain antenna arrangement incorporating RF and IR elements in a common transmission beam path.

The reflectivity of the bispectral window is nearly constant over the entire range of the aperture and reaches close to 70%. This value cannot be increased without further auxiliary measures, such as multilayered embodiments of the window itself or the application of a conducting layer on the front surface of the window. A degradation of the radiation characteristic is thus reduced to this physically necessitated minimum. For purposes of comparison, FIGS. 8A and 8B respectively show the primary sections of the radiation characteristic of a conventional relfector system using a complete or solid main reflector without the present inventive bispectral window, while FIGS. 6A and 6B show the corresponding principle sections of the radiation characteristic for a corresponding reflector antenna system according to the invention, wherein the inventive bispectral window is arranged in a hole or opening in the central area of the main reflector. By comparing FIGS. 8A and 8B with FIGS. 6A and 6B, it is apparent that the radiation characteristics have not been diminished by provision of the bispectral window, but rather have been improved. The advantages of the bispectral window are thus apparent.

According to the invention, an offset double reflector antenna system having a bispectral window in a central area of the main reflector has been provided, which achieves all the optical and electrical requirements for receiving and transmitting both infrared (IR) and millimeter wave (RF) radiations simultaneously and compatibly. The favorable radiation characteristics of the inventive antenna system are shown in the principle sections of the radiation diagram in FIGS. 6A and 6B. The radome losses amount to approximately 1 dB, and the reflectivity of the overall main reflector for radar frequency radiation is nearly 70%. A defocussing of the feed system compensates the remaining radome phase error. The presence of two phase centers requires the translation and rotation or tilting of the feed system. All measurements were carried out for circular polarization. The cross polarization is predominantly determined by the quality of the components such as the circulator and polarizer, and to a lesser degree by the radome and the reflector system.

Figure 13:
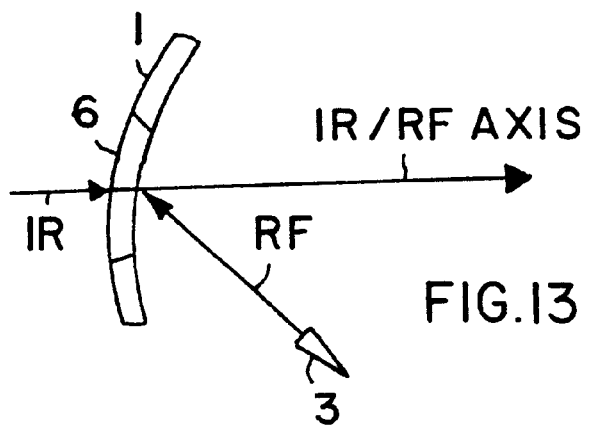
FIG. 13 is a schematic diagram of an offset-fed single reflector antenna with a coincident IR and RF axis according to the invention.
Figure 14:
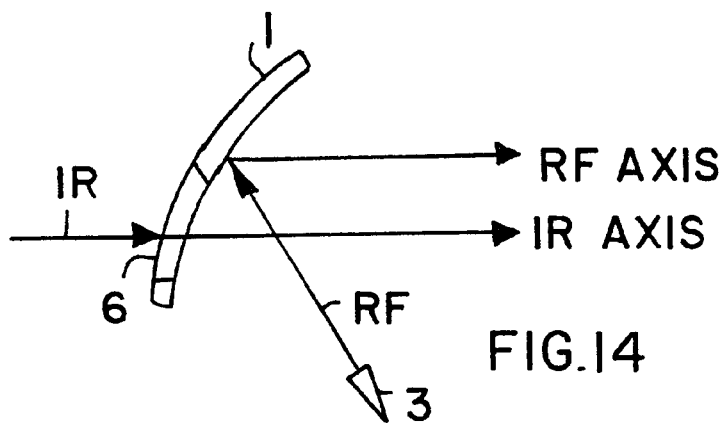
FIG. 14 is a schematic diagram of an offset-fed single reflector antenna with laterally displaced parallel IR and RF axes according to the invention.
Figure 15:
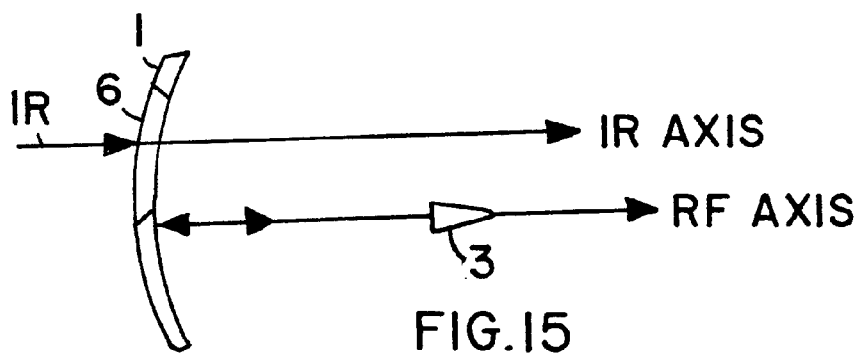
FIG. 15 is a schematic diagram of a central-fed single reflector antenna with laterally displaced parallel IR and RF axes according to the invention.

As alternatives to the above described offset double reflector antenna system, the present reflector 1 having a bispectral window 6 can be incorporated in various other antenna arrangements including single. reflector arrangements. FIG. 13 schematically shows an offset-fed single reflector antenna arrangement in which the reflector 1 with the bispectral window 6 is the single reflector, the RF feed 3 is offset, and the main IR beam axis and the main RF beam axis are coincident. FIG. 14 schematically shows an offset-fed single reflector antenna arrangement in which the reflector 1 with the bispectral window 6 is the single reflector, the RF feed 3 is offset, and the IR beam axis is parallel to and laterally offset from the RF beam axis. FIG. 15 schematically shows a central-fed single reflector antenna arrangement in which the reflector 1 with the bispectral window 6 is the single reflector, the RF feed 3 is arranged along a central axis of the reflector 1, the RF beam axis is coincident with the central axis, and the IR beam axis is parallel to and laterally offset from the RF beam axis.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement for transmitting or receiving infrared radiation and radio frequency radiation, comprising:

a reflector adapted to reflect said radio frequency radiation, having a front reflector surface arranged to have said radio frequency radiation incident thereon, and having an opening therein, and a bispectral window arrangement including a window comprising a first dielectric material;

wherein:

said window is arranged in said opening in said reflector, said window has a rotationally symmetric aspherical front window surface facing toward the same side of said reflector as said front reflector surface and a rotationally symmetric aspherical back window surface opposite said front window surface, said bispectral window arrangement is substantially transmissive for said infrared radiation so as to transmit through said window arrangement a majority of said infrared radiation incident on said window arrangement, and is substantially reflective for said radio frequency radiation so as to reflect from said window arrangement a majority of said radio frequency radiation incident on said window arrangement, said front reflector surface is a free-form surface that is not rotationally symmetric and is not a conic section surface, said free-form surface has a shape around said opening that can be approximated across said opening as a general second order rotationally symmetric surface, and said front window surface has a surface shape defined by said general second order rotationally symmetric surface.

2. The arrangement according to claim 1, wherein said window arrangement expressly excludes any metal layer, any metal grid, and any metal wire.

3. The arrangement according to claim 1, wherein said bispectral window arrangement has a transmissivity of at least 65% with respect to said infrared radiation, and a reflectivity of at least 65% with respect to said radio frequency radiation.

4. The arrangement according to claim 1, wherein said bispectral window arrangement has a transmissivity of at least 70% with respect to said infrared radiation, and a reflectivity of at least 70% with respect to said radio frequency radiation.

5. The arrangement according to claim 1, wherein said bispectral window arrangement has a transmissivity of at least 75% with respect to said infrared radiation, and a reflectivity of at least 75% with respect to said radio frequency radiation.

6. The arrangement according to claim 1, wherein said first dielectric material has a high dielectric constant and a low loss factor.

7. The arrangement according to claim 1, wherein said first dielectric material has a dielectric constant in a range from 7.5 to 9.0.

8. The arrangement according to claim 1, wherein said dielectric material comprises at least one of ZnS, Ge and Si.

9. The arrangement according to claim 1, wherein said surface shape of said front window surface is defined by a section of a hyperboloid.

10. The arrangement according to claim 1, wherein said surface shape of said front window surface is flush and optimally matched to a shape of said free-form surface of said front reflector surface, and said back window surface has a surface shape that optimizes a reflectivity of said window arrangement with respect to said radio frequency radiation.

11. The arrangement according to claim 10, wherein said surface shape of said front window surface is optimally matched to said shape of said free-form surface of said front reflector surface by a least squares fit minimization of a deviation therebetween.

12. The arrangement according to claim 1, wherein said opening has a circular perimeter when seen in a main radiation beam direction of said reflector.

13. The arrangement according to claim 1, wherein said back window surface has a surface shape that is configured so as to maximize a reflectivity of said window arrangement with respect to said radio frequency radiation, so as to maximize a transmissivity of said window arrangement with respect to said infrared radiation, and so as to achieve a low total optical aberration with respect to said infrared radiation.

14. The arrangement according to claim 1, wherein said window arrangement consists essentially of said window, which consists essentially of said first dielectric material.

15. The arrangement according to claim 1, wherein said window arrangement further comprises a metallic coating layer that is applied on said front window surface and that is adapted to increase a reflectivity of said window arrangement with respect to said radio frequency radiation.

16. The arrangement according to claim 1, wherein said window has a multilayered structure that comprises a plurality of dielectric layers and that is adapted to increase a reflectivity of said window arrangement with respect to said radio frequency radiation.

17. The arrangement according to claim 1, wherein said window arrangement further comprises a coating layer that is applied on said back window surface and that is adapted to increase a transmissivity of said window arrangement with respect to said infrared radiation.

18. The arrangement according to claim 1, wherein said window has a thickness between said front window surface and said back window surface that corresponds to an odd multiple of one quarter of the wavelength of said radio frequency radiation in said first dielectric material.

19. The arrangement according to claim 1, wherein said window has a thickness between said front window surface and said back window surface that is adapted to cause a constructive interference between a first reflected beam of said radio frequency radiation reflected from said front window surface and a second reflected beam of said radio frequency radiation reflected from said back window surface, and wherein said thickness is selected so as to minimize a loss of energy of said radio frequency radiation reflected from said window.

20. The arrangement according to claim 1, wherein said reflector is a main reflector, and further comprising:
an infrared element selected from an infrared source, an infrared sensor, and a combined infrared source and sensor, that is arranged on a side of said main reflector opposite said front reflector surface and that is oriented so that a beam of said infrared radiation extends directly between said infrared element and said window arrangement and through said window arrangement;
a radio frequency element selected from a radio frequency source, a radio frequency sensor, and a combined radio frequency source and sensor; and
a subreflector;
wherein said subreflector and said radio frequency element are arranged and oriented so that a beam of said radio frequency radiation extends between said radio frequency element, said subreflector and said main reflector and is reflected respectively from said subreflector and said main reflector.

21. The arrangement according to claim 20, wherein said arrangement is a Cassegrain or Gregorian offset double reflector antenna, and wherein a main beam axis of said beam of said infrared radiation is coincident with a main beam axis of said beam of said radio frequency radiation extending from said main reflector.

22. The arrangement according to claim 20, wherein said arrangement is a Cassegrain or Gregorian offset double reflector antenna, and wherein a main beam axis of said beam of said infrared radiation is parallel and laterally offset relative to a main beam axis of said beam of said radio frequency radiation extending from said main reflector.

23. The arrangement according to claim 20, wherein said radio frequency element and said subreflector are each movably and tiltably mounted.

24. The arrangement according to claim 1, further comprising:
an infrared element selected from an infrared source, an infrared sensor, and a combined infrared source and sensor, that is arranged on a side of said main reflector opposite said front reflector surface and that is oriented so that a beam of said infrared radiation extends directly between said infrared element and said window arrangement and through said window arrangement; and
a radio frequency element selected from a radio frequency source, a radio frequency sensor, and a combined radio frequency source and sensor, that is arranged and oriented so that a beam of said radio frequency radiation extends directly between said radio frequency element and said reflector and is reflected from said reflector.

25. The arrangement according to claim 24, wherein said arrangement is an offset single reflector antenna, and wherein a main beam axis of said beam of said infrared radiation is coincident with a main beam axis of said beam of said radio frequency radiation extending from said main reflector.

26. The arrangement according to claim 24, wherein said arrangement is an offset single reflector antenna, and wherein a main beam axis of said beam of said infrared radiation is parallel and laterally offset relative to a main beam axis of said beam of said radio frequency radiation extending from said main reflector.

27. The arrangement according to claim 24, wherein said arrangement is a central feed single reflector antenna, said radio frequency element is arranged along a central axis of said reflector, a main beam axis of said beam of said radio frequency radiation is coincident with said central axis, and a main beam axis of said beam of said infrared radiation is parallel and laterally offset relative to said main beam axis of said beam of said radio frequency radiation.

28. The arrangement according to claim 1, further comprising a radome consisting essentially of a single-layer radome wall having a configuration of a portion of a spherical shell and having a uniform wall thickness everywhere.

29. The arrangement according to claim 28, wherein said radome wall consists of a single layer of a low loss dielectric material.

30. The arrangement according to claim 29, wherein said dielectric material is ZnS and wherein said wall thickness is about 7 mm.

* * * * *